AUTOMATIC NOISE REJECTION APPARATUS
Filed Nov. 28, 1967
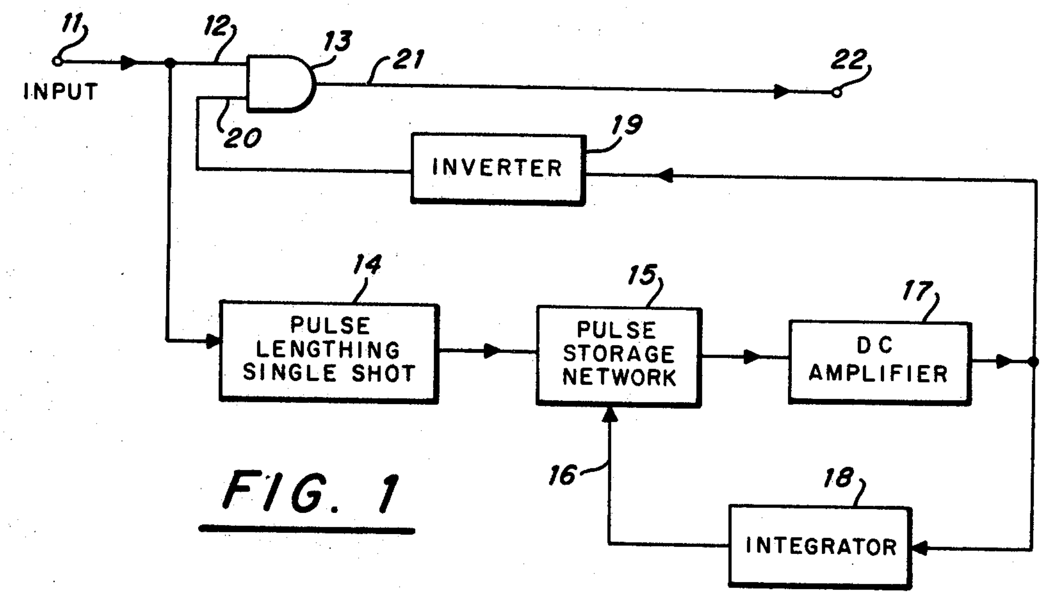
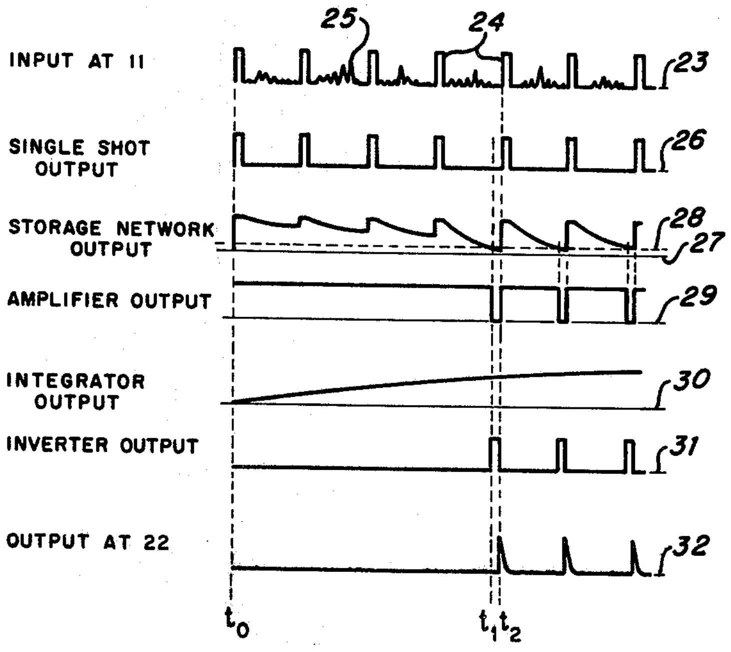
FIG. 2
INVENTOR.
RONALD A. TURNER
BY J. Peter Mohn
Ronald Critchen
ATTORNEYS

United States Patent Office 3,497,815
Patented Feb. 24, 1970

3,497,815

AUTOMATIC NOISE REJECTION APPARATUS

Ronald A. Turner, La Mesa, Calif., assignor to the United States of America as represented by the Secretary of the Navy Filed Nov. 28, 1967, Ser. No. 686,232
Int. Cl. H03k 5/20
U.S. Cl. 328—110 3 Claims

ABSTRACT OF THE DISCLOSURE

An automatic noise rejection apparatus for removing undesired noise signals from a repetitive pulse signal. The device operates by gating an input signal to an output only during those time intervals when the desired repetitive pulses should occur. Between pulses, the gate is inhibited and other signals such as noise cannot pass to the output. The apparatus includes circuitry which automatically produces signals for controlling the gating means in response to the repetition frequency of the desired repetitive pulses.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to noise rejection apparatus and more particularly to such noise rejection apparatus which automatically determines the repetition frequency of an input signal and inhibits any other signals not in synchronism with such frequency.

The elimination of noise or undesired signals from desired signals is a continuing problem in signal processing equipment. When a desired signal occurs at a constant repetitive rate it is relatively easy to inhibit or block any other signals not occurring at the same rate. Various timed gating circuits using delay lines or other such devices can be used in such instances. Where, however, the repetition rate of the desired signals is not a constant, but instead may vary somewhat, the noise inhibiting problem becomes more complex.

An object of this invention, therefore, is to provide a simple apparatus for inhibiting noise from repetitive signals of varying repetition rates.

A more particular object of this invention is to provide a noise inhibiting apparatus which automatically adjusts itself for changes in repetition rate of the desired repetitive signals.

This invention provides a simple and efficient solution to the above noted problem by providing a gating means arranged to pass signals from an input terminal to an output when energized by an enabling signal. Means are provided for automatically producing an enabling signal having a repetition rate equal to that of the desired repetitive pulse signals. The enabling signal producing means comprises a pulse lengthening circuit, a storage network for receiving lengthened pulses, a DC amplifier operating in a bistable manner, and an integrator. The pulse storage network is adapted to have a variable time constant which can be controlled in accordance with a magnitude of a control signal. The DC amplifier is arranged to be essentially an "on" or "off" device and assumes its "off" position when an input signal is below some minimum threshold level. A pulse signal is therefore produced at the output of the DC amplifier which is subsequently integrated and supplied to the pulse storage network as a control signal. The time constant of the storage network is therefore controlled by the integrated or average value of the DC amplifier output. By inverting the amplifier output, a signal is produced which, when connected to the gating means, functions to inhibit pulses from passing through the gating means except for short periods or intervals occurring at the same repition rate as the desired pulse input signals.

The above objects and features of this invention will be better understood from the ensuing detailed description in conjunction with the attached drawings wherein:

FIG. 1 is a block diagram of one embodiment of this invention.

FIG. 2 is a graph of typical waveforms at various points in the circuit of FIG. 1 during its operation.

Before considering the operation in detail, the nature of the signals on which the invention operates should be considered. The device will only operate with signals which are repetitive in nature. The exact repetition frequency of the signals may vary, however, and it is those features of the apparatus which permit it to operate on varying repetition frequencies or rates that make this invention particularly unique.

Referring now to FIG. 1, a typical embodiment of this invention is shown to include an input terminal 11 for receiving the signals to be processed. Signals from the terminal 11 are supplied to one input 12 of an And gate 13. Gate 13 operates in the conventional manner, i.e., it produces an output signal when signals are present at both of its inputs. Signals from terminal 11 are also supplied to pulse lengthening single shot 14. Lengthener 14 may be any sort of a monostable or single shot device which, when triggered, produces an output signal having some predetermined time duration. Stretched or lengthened signals from lengthener 14 are then supplied to a pulse storage network 15. Network 15 may be any device which is capable of having its time constant varied in accordance with the magnitude of some control signal. Network 15 therefore produces a series of decaying pulse signals, the rate of decay being dependent on the value of a control signal supplied to input 16 and hence the particular time constant of the network. The DC amplifier 17 receives the output of network 15. As noted previously, amplifier 17 is essentially a bistable device. The magnitude of signals at its output, therefore, assumes either one of two levels dependent on whether signals above a certain threshold level are present at its input. The operation of the amplifier in conjunction with the storage network will be better understood later from a study of the waveforms present in the apparatus. Signals from the output of the amplifier 17 are supplied to integrator 18 which produces a signal having a magnitude equal to the average magnitude of the amplifier output. The output signal of the integrator 18 supplies the storage network 15 with its control signal at input 16 for determining the time constant of the network. The output of the amplifier 17 is also supplied to an inverter 19 which functions in the conventional manner and produces a signal suitable for gating in the And gate 13. The inverter, therefore, has its output connected to input 20 of the gate 13. The output 21 of gate 13 is connected to terminal 22. It is at this latter terminal that the noise-free signals for which this apparatus is designed to produce are ultimately available for further usage in associated equipment.

OPERATION

Reference now to the waveforms of FIG. 2 will aid the understanding of the manner in which the apparatus of FIG. 1 operates on the signals being processed. A typical composite input signal is shown on line 23 of FIG. 2. It can be noted that the signal comprises a series of repetitive pulses such as 24 with miscellaneous noise signals such as 25 spaced therebetween. Receipt of the composite input signal by the single shot 14 causes the latter circuit to produce a series of pulses such as that shown on line 26 of FIG. 2. The single shot is triggered by the leading edge of the input pulses and in response to each produces a lengthened output pulse of some fixed duration.

Initially, at a time such as $t_0$, the storage network has no signal at its control input 16 and its time constant is consequently long. As the magnitude of signal increases at the control input, the time constant of the network becomes progressively shorter. Initially, then, as shown on line 27 of FIG. 2, the pulses from the single shot are received by the network and each decays at a progressively increasing rate as the network time constant is shortened by the increasing signal at its control input. As long as the output of the storage network is above the threshold indicated by dotted line 28, amplifier 17 maintains a constant output level as shown on line 29 of the graph. When the constant output level is integrated the integrator produces an increasing signal level which approaches the magnitude of the amplifier output. It is the integrator output shown on line 30 of FIG. 2 which controls the time constant of the network 15.

When the time constant of the network is shortened to a point exemplified by $t_1$ in FIG. 2, the network output is able to decay to a level below that of threshold 28. It should be recalled that when amplifier 17 receives an input below its threshold level it changes state to what might be called its "off" position. It is turned "on" again at a time $t_2$ when network 15 is supplied with a new pulse from the single shot. From time $t_2$ the operation of the device is essentially stabilized as may be noted from the graph. By inverting the amplifier output the duration between time $t_1$ and $t_2$ can be converted to a positive pulse for driving the gate 13. The inverter output is shown on line 31 of FIG. 2.

The signals on line 23 of FIG. 2 and line 31 of the same figure are both supplied to gate 13 and the latter produces an output when such signals are in time coincidence. It can be noted from the diagram of FIG. 2 that such coincidence only occurs when desired pulses are present at the input to the device and consequently any intermediate noise does not pass through the gate to output 22.

If the repetition rate of signals at input 11 should change, the time constant of network 15 ultimately changes resulting in a change in the output of amplifier 17 and ultimately a change in the frequency of the gating pulses to the gate 13. The device is therefore able to automatically compensate for repetition rate changes in the signals on which it operates.

It may be noted that there is a delay between the receipt of input signals and the production of gated output signals, however when the input signals are essentially of a regular repetitive nature such delay is of no consequence.

The exact construction of the various circuits used in the apparatus of this invention has not been described since one skilled in the art could implement the function of the various elements of the invention by any number of known techniques.

It should be apparent therefore, that by using the teachings of this invention a device may be constructed to automatically eliminate noise from a repetitive pulse signal even though that signal may not have a perfectly constant repetition rate.

As a typical example of the utilization of the apparatus of this invention it may be noted that same has been used by the inventor to eliminate noise from radar trigger signals. In particular, the apparatus has permitted inexpensive recording equipment to be used to record and play back such radar triggers.

Although the invention has been disclosed and described with reference to a particular embodiment thereof, it should not be limited thereto, for various changes and modifications could be made by one having ordinary skill in the art without departing from the spirit and scope of the invention as defined in the following claims.

What is claimed is:

1. Apparatus for inhibiting noise from a series of repetitive pulse signals comprising:
- an input terminal for receiving composite signals including noise,
- gating means arranged to pass signals from said input terminal to an output when energized by an enabling signal,
- means for automatically producing an enabling signal having a repetition rate equal to that of the desired repetitive pulse signals,
- said latter means comprising:
- means connected to said input terminal for receiving pulses therefrom and producing lengthened versions of such pulses,
- a storage network for receiving lengthened pulses and adapted to have a time constant proportional to the magnitude of a control signal,
- an amplifier connected to receive stored pulses from said network,
- said amplifier being operative to produce a fixed output level so long as its input is above a minimum threshold level,
- means connected to said amplifier output for integrating signals at said output and supplying them as a control signal to said storage network,
- an inverter connected to said amplifier output and arranged to invert signals present at said output and supply same to said gating means,
- said inverted signals being adapted to enable said gating means when said amplifier input is below its minimum threshold,
- whereby said gating means is enabled at a rate equal to that of the desired pulse signals, and noise signals occurring at different rates are inhibited.

2. The apparatus of claim 1 wherein said means for producing lengthened pulses comprises a single-shot multivibrator.

3. The apparatus of claim 1 wherein said series of repetitive signals are radar trigger pulses.

References Cited

UNITED STATES PATENTS

| | | | |
|---|---|---|---|
| 3,072,855 | 1/1963 | Chandler | 328—110 |
| 3,094,665 | 6/1963 | Wildman | 328—165 |
| 3,241,077 | 3/1966 | Symth et al. | 328—165 |

JOHN S. HEYMAN, Primary Examiner

R. L. WOODBRIDGE, Assistant Examiner

U.S. Cl. X.R.

307—232, 233; 328—109, 1511, 165; 343—5